US006241877B1

(12) United States Patent
Berkey

(10) Patent No.: US 6,241,877 B1
(45) Date of Patent: Jun. 5, 2001

(54) WATER GARDENING SYSTEM

(76) Inventor: Edward B. Berkey, P.O. Box 3483, Bellevue, WA (US) 98009

( * ) Notice: Subject to any disclaimer, the term of this patent is extended or adjusted under 35 U.S.C. 154(b) by 0 days.

(21) Appl. No.: 09/183,628

(22) Filed: Oct. 30, 1998

(51) Int. Cl.[7] .............................................. B01D 35/027
(52) U.S. Cl. ...................... 210/97; 210/121; 210/170; 210/172; 210/167; 210/196; 210/315; 210/447; 210/232; 210/436; 210/416.1; 210/195.1; 210/257.1; 210/258; 210/261
(58) Field of Search .................... 210/97, 98, 104, 210/105, 335, 337, 338, 342, 167, 169, 170, 416.1–416.3, 100, 196, 244–246, 488, 232, 238, 532.2, 172, 121, 123, 127, 195.1, 261, 257.1, 258, 259, 315, 418, 435, 436, 447, 452, 460; 405/36, 37, 41, 52, 53, 127; 137/236.1; 4/508

(56) References Cited

U.S. PATENT DOCUMENTS

| | | | |
|---|---|---|---|
| 921,513 | * | 5/1909 | Crawford . |
| 2,167,055 | | 7/1939 | Trowbridge . |
| 2,809,752 | * | 10/1957 | Leslie . |
| 3,409,223 | | 11/1968 | Gosh . |
| 3,465,529 | * | 9/1969 | Helle . |
| 4,002,566 | | 1/1977 | Smith . |
| 4,081,379 | * | 3/1978 | Smith . |
| 4,498,984 | * | 2/1985 | Colson . |
| 4,686,718 | | 8/1987 | Kinkead et al. . |
| 4,740,307 | * | 4/1988 | Buelteman . |
| 5,120,157 | * | 6/1992 | Todd, Sr. et al. . |
| 5,167,368 | | 12/1992 | Nash . |
| 5,178,752 | * | 1/1993 | McKinnon . |
| 5,255,999 | * | 10/1993 | Perslow . |
| 5,299,384 | * | 4/1994 | Andrews . |
| 5,322,035 | | 6/1994 | Hawes et al. . |
| 5,367,723 | * | 11/1994 | Pleva et al. . |
| 5,427,679 | * | 6/1995 | Daniels . |
| 5,536,397 | * | 7/1996 | D'Offay . |
| 5,584,991 | | 12/1996 | Wittstock et al. . |
| 5,624,560 | * | 4/1997 | Voll et al. . |
| 5,720,056 | | 2/1998 | Aymes . |
| 5,993,649 | * | 11/1999 | DeBusk et al. . |
| 6,054,045 | * | 4/2000 | Wittstock et al. . |

* cited by examiner

Primary Examiner—Matthew O. Savage
Assistant Examiner—David Sorkin
(74) Attorney, Agent, or Firm—Christensen O'Connor Johnson Kindness PLLC

(57) ABSTRACT

A circulation and filtration system is provided for use with water gardens having a water container adapted to hold water at a preferred fill height. The system includes a reservoir, an intake line, a pump, and a return line. The reservoir is located near the water container and is capable of holding a reserve of water. In one embodiment, the reservoir includes an upright basket filter located therein. The intake line includes a first end opening positionable within the water container near the preferred fill height and a second end opening connected to the basket filter. During use, water flows into the basket filter through the intake line via gravity. The pump is located either within the reservoir or externally from the reservoir though connected to the reservoir through additional piping. The return line includes a first end connected to the pump and a second end positionable at a desired location in the water garden. The reservoir is sufficiently large to provide reserve water in an amount capable of compensating for the volume of water held in the return line, while additionally providing room for water overflow from the water container.

15 Claims, 4 Drawing Sheets

WATER GARDENING SYSTEM

FIELD OF THE INVENTION

The present invention relates to filtration systems, and more particularly, to water filtration systems for use in outdoor water gardening ponds, waterfalls, fountains, pools, and the like.

BACKGROUND OF THE INVENTION

As used herein, the term "water garden", "water gardening system", and "water garden system" refer to any one of a number of types of outdoor constructs having at least one open water container, e.g., a pond, a lake, a pool, etc. Many of these constructs further include a fountain, a waterfall, multiple interconnected ponds, subsidiary streams, etc. In all of these systems it is important to circulate and filtrate the water in order to reduce debris and to add needed oxygen. In some systems it is also necessary to move water from one elevation to another, higher elevation (such as to a waterfall outlet or stream head.)

Currently, pond circulation and filtration are accomplished using water gardening systems that typically have a submersible circulation pump. It is also known to use a non-submersible pump (such as an external, out-of-pond pump) with a suction line placed between the non-submersible pump and the pond. The pump draws water from the suction line positioned at one location within the pond and returns the water through an output line having an output opening located elsewhere in the pond. Some pumps include filtering components. A separate dedicated waterfall pump is sometimes provided for moving pond water from one elevation to another, higher elevation. It is known to place both the circulation and waterfall pumps either in the pond itself, outside the pond in open space, or outside the pond in a dry container buried in adjacent ground.

There are a number of problems associated with current water gardening systems. One significant problem is that in-pond pump filters and suction lines clog easily. Depending on the accessibility of these components, removal of the clogging debris is not always easily accomplished. For this reason, there is a tendency for owners to neglect clogged pumps, which can result in the pumps burning out due to having to work harder to draw water.

Another significant problem associated with current water gardening systems has to do with maintaining a desired water level within the open water container. Over time, the water level in a pond will drop due to evaporation. The owner will usually place additional water in the pond to compensate. If the pump is then turned off, the water in the stream and waterfall will return to the pond. Because the owner likely did not leave enough room in the pond for the volume water in motion, such as the water in a stream or flowing from a higher water body, the pond will overflow. Similarly, if a water gardening system includes long, wide, or high-volume streams leading away from the main pond and the main pond surface is comparatively small relative to the water in motion, the main pond water level will drop when the system is first turned on. The owner will usually add more water. When the system is turned off, the pond will overflow. For ponds with large water systems this can result in a significant flooding problem, as well as significant water waste.

Thus, a need exists for a water gardening circulation and filtration system that is capable of keeping the pond water level at a desired height even though a significant amount of evaporation may occur or a significant amount of in-motion water may be used. The ideal system would further be able to filter large or small volumes of water in a manner that does not clog system pumps and that is easy to clean, with minimal design and installation restraints. The present invention is directed to fulfilling these needs.

SUMMARY OF THE INVENTION

In accordance with aspects of the present invention, a circulation system is provided for use with water gardens having a container adapted to hold water at a preferred fill height. The circulation system includes a reservoir, an intake line, a pump, and a return line. The reservoir is located near the water container and is capable of holding an amount of reserve of water. The intake line includes a first end opening positionable within the water container near the preferred fill height and a second end opening connected to the reservoir. During use, water flows into the reservoir through the intake line. The pump is either a submersible pump or an external pump in communication with the reservoir via additional piping. The return line interconnects between the pump and a desired location in the water garden (such as a fountain head or waterfall outlet). The pump pushes reserve water back to the water garden through the return line. The reservoir is sufficiently large to provide reserve water in an amount capable of compensating for evaporation in the water container and/or the volume of water that is in motion when the system is activated.

In accordance with other aspects of this invention, the reservoir includes at least one filter located therein and adapted to receive water from the intake line second end opening. In one embodiment, the at least one filter is an easily removable basket filter. A preferred basket filter includes an outer rigid cylindrical wire mesh member and an internal flexible net. Other filter materials may be used such as perforated plastic or fibrous nets. The internal net catches large debris, while the outer mesh member catches smaller debris. The reservoir preferably includes an upper opening sized to allow removal of the filter for cleaning and/or replacement. Additionally, the reservoir may include a lid for the upper opening. The lid includes a vent whereby portions of the filter are removable from the reservoir through the vent.

In accordance with further aspects of this invention, the intake line first end opening is formed as an elbow member. In one embodiment, the elbow member is rotatable to allow adjustment of the preferred fill height. In another embodiment, one or more extension members are connected to the elbow in order to bring it up to the preferred fill height.

In accordance with further aspects of this invention, an alternative embodiment of filtering components is provided, including an upright cylindrical filter positionable within a reservoir and a cylindrical annular media chamber disposed about the upright cylindrical filter. The media chamber includes an outer wall, an inner wall and a filtering media disposed therebetween. The chamber outer wall has an upper rim. The chamber inner wall includes a number of passages located at a lower region therein. During use, water flows into the upright cylindrical filter, into the media chamber via the inner wall passages, through the filtering media, and over the chamber outer wall rim.

Various other features may be used in the present invention. In one embodiment the system includes a water supply line connected between a water source and the reservoir, and a refill valve positioned within the reservoir. A large reduction of the reserve water in the reservoir triggers the refill valve to allow addition water to enter the reservoir through the water supply line. In another embodiment, the pump includes a shut off valve triggered by a low water level within the reservoir.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE EMBODIMENT

In general, the present invention water gardening system includes a separate water reservoir 10 that houses both filtering and pumping components. The arrangement of the present invention is such that whenever the water level in a water container is low, water within the reservoir is provided to the container in compensation. If the water level of the container should increase, the excess water is held within the reservoir. In this manner, a near constant level of water is maintained within the water container at all times.

Figure 1:
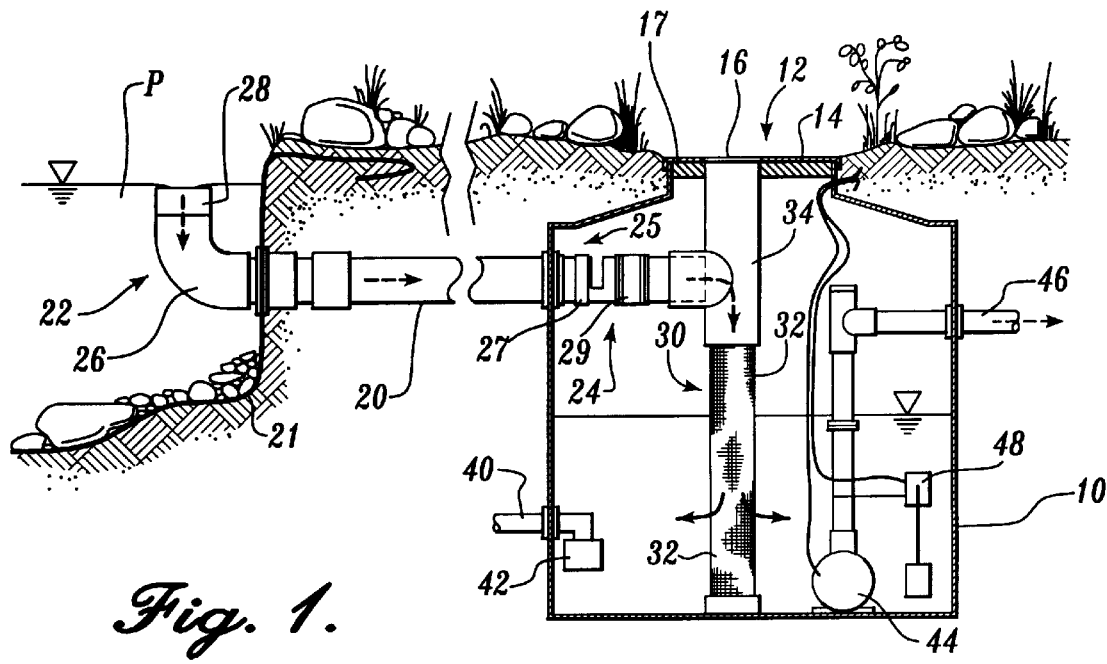
FIG. 1 is a side view schematic of one embodiment of a water gardening system formed in accordance with the present invention.

In more detail and referring to FIG. 1, the water reservoir 10 is a large holding tank that is separate from the water container, and that is connected to the water container by a pipe at a variable distance. The tank includes an upper opening 12 positioned roughly at ground elevation. A removable tank lid 14 is provided with a vent opening 16. A sealing plug 15 (see FIG. 4) closes out the vent opening 16. An optional removable covering 17 is fitted to the top opening of the reservoir, with an opening to accommodate the vent opening 16. The covering 17 prevents dirt from falling into the reservoir during removal of the lid. In the example embodiment of FIG. 1, the water container is a man-made pond P formed using conventional methods and materials. A number of aesthetic objects, such as rocks, pebbles, sand, plants, etc., are positioned within and about the pond.

A water intake line 20 connects the reservoir 10 with the pond P. As shown in the embodiment of FIG. 1, the intake line passes through a pond wall 21. The pond wall is preferably sealed (e.g., using a rubber gasket or the like) at the location of the passing intake line, so that pond water does not seep out of the pond and saturate the adjacent ground. The intake line includes first and second ends 22, 24, each having an opening through which water can enter and exit the intake line, respectively. A valve 25 is preferably provided and located near the intake line second end within the reservoir. The valve shown in FIG. 1 includes a collar 27 slidably engage about the line 20 to cover (and expose) a partial crosswise slot located in the line within the reservoir. The valve 25 may be used to stop unfiltered pond water from entering the reservoir while various components within the reservoir are being serviced and/or cleaned. During use, the collar is slid away from the slot and a disc made of a solid or filtering material is slid therein. This allows the filtering components to be removed without having debris enter the reservoir.

Figure 3A:
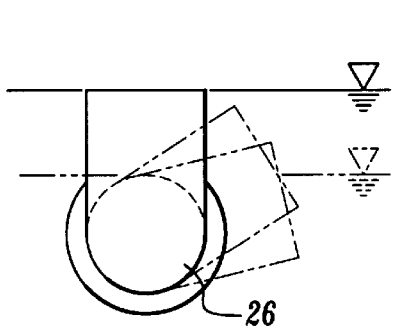
FIG. 3A is an end view of an elbow pipe member, with rotated views shown in phantom.
Figure 3B:
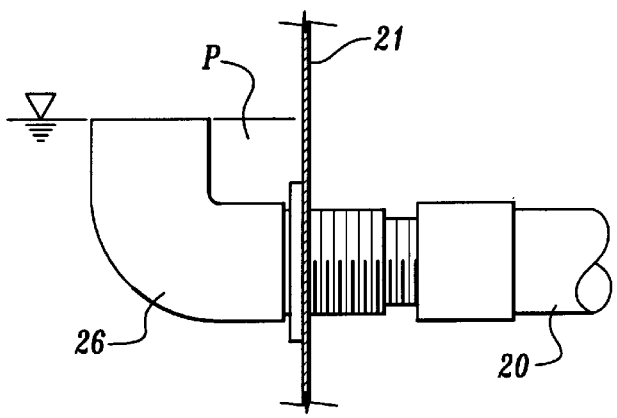
FIG. 3B is a side view of the member of FIG. 3A.

As shown in FIG. 1, the first end is preferably formed as an elbow 26. The first end opening is located relative to the pond so that the first end opening itself is facing upward and at a desired pond water level height (also called "fill height" herein.) In an alternative embodiment, the water intake line is positioned so that the first end opening is below the fill height. One or more extension rings 28 (also shown in FIG. 1) connect to the first end so as to adjust the position of its opening (and hence the pond fill height) upward. In yet another embodiment (shown in FIGS. 3A and 3B), the elbow is a separate pipe member that is rotatably attached to the intake line. By rotating the elbow, the user can adjust the water level between various heights.

During use, pond water enters the intake line first end 22, travels through the intake line, and exits out the intake line second end 24 which is positioned within the reservoir. Between the pond and the reservoir, the intake line is substantially linearly shaped. It is also useful to orient the intake line horizontally or at a downward sloping angle, so that entering pond water will at all times naturally flow into the reservoir via gravity.

Figure 2:
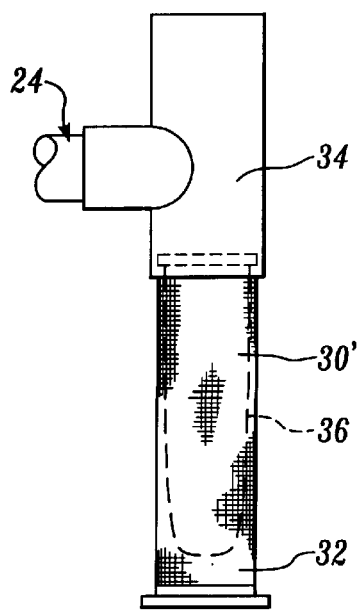
FIG. 2 is a side view of one embodiment of a basket filter formed in accordance with the present invention with portions shown in phantom.

A filter 30 is located within the reservoir 10 and is oriented in an upright manner. The intake line passes into the reservoir tank, where the intake line second end connects to an upper region of the filter. Because the filter is located below the intake line second end, incoming debris will flow downward into the filter. The filter shown in FIGS. 1 and 2 is a basket filter 30' having a rigid outer cylindrical wire mesh member 32. A closed distal end of the mesh member is adapted to rest on the reservoir floor. An open proximal end of the mesh member 32 is connected to a T-shaped tubular connector 34. The non-aligned arm of the T-shaped connector is attached to the intake line second end 24. In the embodiment of FIG. 1, a coupler 29 connects the non-aligned arm of the T-shaped connector to the intake line. The rubber coupler is slid back on the intake line allowing the filter to be easily removed through the top of the tank for servicing of the filter. The upper end of the T-shaped connector engages the reservoir lid 14 at the vent 16.

Referring to FIG. 2, a removable internal flexible net 36 is provided to catch large debris. Smaller debris is trapped in the outer mesh member 32. The flexible net may be periodically removed through the reservoir lid vent for cleaning. The rigid mesh member may also be removed for cleaning by sliding the slot cover 27 back, inserting the disc, disengaging the T-shaped connector 34 from the intake line 20 and lifting the basket filter out of the reservoir upper opening.

Optional filters may be used to provide additional filtering, such as during cleaning or vacuuming of the pond. As will be appreciated, a wide variety of alternative arrangements are possible. For example, other types of filters may be connected to the intake line second end. Example filters include bio-filters, chemical filters, carbon, sand, polyspun materials, etc. It is desirable for the filtering of the incoming water to be accomplished prior to the water being used by the pumping components. Alternative embodiments having additional filters are discussed below with reference to FIG. 4.

Referring back to FIG. 1, a water supply line 40 is connected to the reservoir. The line 40 is connected to a water source, such as a water main or house supply line. The water lines described herein may be formed of any available conventional piping material, such as PVC, poly, other plastics, copper, steel, etc. A refill valve 42 is housed within the reservoir 10 and is in communication with the water supply line 40. When the water in the reservoir water becomes too low, the refill valve triggers the water supply line on, thus adding water to the reservoir. Once filled appropriately, the refill valve 42 triggers the water supply line off.

Still referring to FIG. 1, the refill valve 42 is preferably positioned at a lower level within the reservoir. This allows evaporation refilling to occur only when necessary to ensure continuous pumping, thereby assuring sufficient reservoir capacity to capture rainfall and irrigation overspray. The refill value is also preferably positioned at a lower level location to prevent refilling of the reservoir during the normal pumping cycle.

One or more conventional pumps 44 are connected to the reservoir 10. Shown in FIG. 1 is a submersible circulation pump positioned within the reservoir itself Alternatively, an external pump 44 may be used and located outside of the reservoir 10, connecting to the water within the reservoir 10 via additional piping. Each pump 44 is connected to one or more return lines 46 that emanate from the reservoir (or from an external pump as the case may be) to other components at various locations in the water garden. The present invention advantageously separates the task of filtering the incoming water from the pumping device, ensuring that only filtered water is provided to the pump and the pump suction intake. As will appreciated, this arrangement makes it much less likely that a pump will become clogged from debris. This increases the life of the pump, improves pumping efficiency, and improves the pump's capability to move large quantities of water.

As an optional precautionary measure, each pump includes a low-level shut-off switch 48, such as a mechanical float switch, to prevent damage to the pumps from lack of reservoir water. The various electrical and electro-mechanical components of the present invention are connected to an aboveground electrical outlet or other electrical source.

Still referring to FIG. 1, during use of the present invention water garden system, pond water enters the water intake line 20 and moves into and through the basket filter 30' via gravity and/or pond water pressure. Because the opening of the intake line is located at the preferred pond fill height, excess pond water feeds into the reservoir whenever the pond water level rises above this fill height. Should the pond water level drop, the pumps will continue to pump water out to their respective components, but instead of using pond water, the pumps will use reserve water in the reservoir. In designing the present invention for a particular garden, care should be given as to the volume of reservoir used, so that sufficient reserve water will be available, with sufficient space to accept excess water. In this manner, water can be automatically added to or subtracted from the pond as necessary. This reduces wasteful pond overflow when the system is shut off, and allows the system to compensate for water evaporation.

Another advantage of the present invention is that the basket filter is easily removed through the reservoir opening for cleaning. This eliminates the undesirable need for a person to get into a pond to obtain a pump. If a removable internal flexible net 36 is used, it may be easily removed without having to remove the lid. Because the majority of the filtering is separated from the pumping task, the pumps will not risk over heating due to high amperage draws that occur with restricted pump intakes. In addition, the entire system is easy to assemble, install, and maintain.

Figure 4:
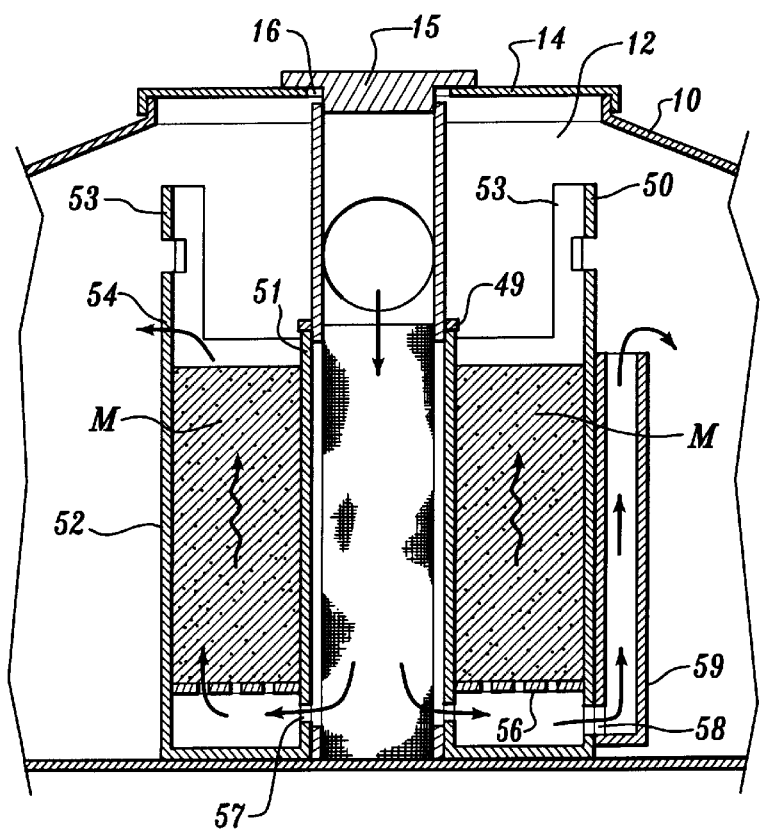
FIG. 4 is a cross-sectional side view of alternative filter arrangements for use in a water gardening system formed in accordance with the present invention.
Figure 5:
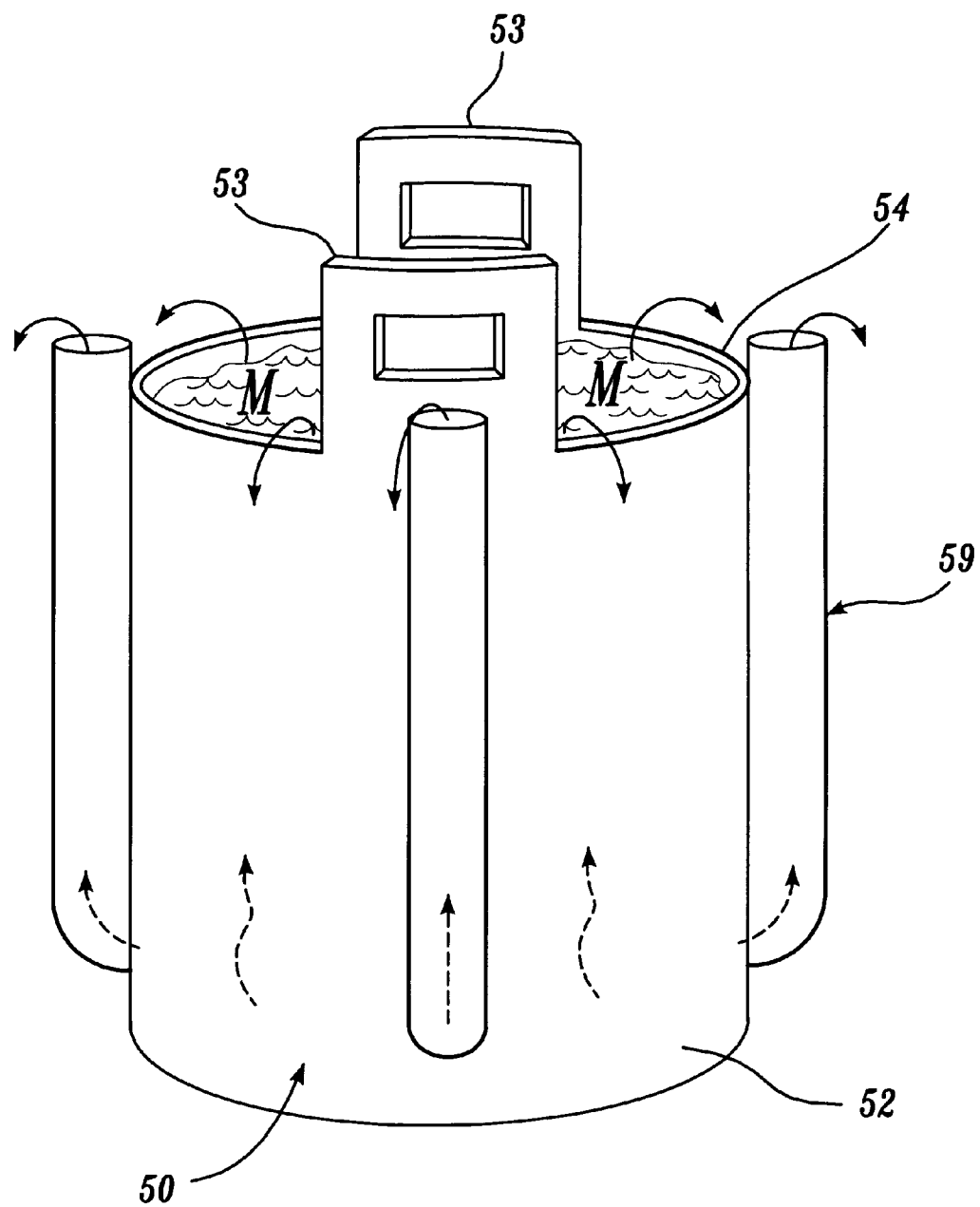
FIG. 5 is a perspective view of an alternative filter arrangement for use in a water gardening system formed in accordance with the present invention.

FIGS. 4 and 5 illustrate alternative arrangements of filtering components for use in the present invention. A cylindrical annular media chamber 50 is provided within the reservoir 10 and is disposed about the basket filter 30'. The chamber 50 includes an inner wall 51 with a diameter that is slightly larger than the basket filter outer diameter. A collar 49 fitted about the connector 34 allows the filter 30' to rest upon the chamber inner wall 51. The chamber 50 further includes an outer wall 52 with a diameter that is preferably less than the reservoir opening 12 and an upper rim 54. Opposed handles 53 preferably extend upward from the upper rim to allow a person to easily grab the handles and lift the chamber from the reservoir for cleaning.

A filtering media M is disposed within the volume defined by the inner and outer chamber walls 51, 52. Various medias may be used depending on the particular garden. Example medias include carbon, sand, plastic, rock, etc. A number of passages 57 are located in the lower inner wall to permit water from the basket filter 30' to enter the lower end of the chamber 50.

A perforated base plate 56 is positioned within the media chamber at a location above the inner wall passages 57. The perforated base plate 56 is provided to support the media M and may further be used to regulate the flow of water into the chamber by the size and number of its perforations. This is particularly useful when using a bio-filtration or chemical filtration where the volume and speed of water may be important considerations. The perforated annular plate is integrally formed with the chamber walls or may be alternatively formed separately and dropped into position through the upper opening of the annular chamber to rest against a support shelf or the like.

During use, water flows downward in the filter 30', through the inner wall passages 57, and up into the media chamber media M through the perforated base plate 56. Upon reaching a higher elevation in the media chamber, the water encounters the upper rim 54, flows over the rim and into the reservoir areas surrounding the media chamber 50. The collar 49 encourages water to move downward through the filter 30' and not upward in the space between the filter 30' and the chamber inner wall 51.

The additional filtration provided by the media chamber is ideal for bio-filtration purposes. Because is important to not have excessive flows forced up through the filter media and potentially wash away established bio-colonies, a further alternative embodiment is shown in FIG. 4 in which bypass tubes 59 are connected to the media chamber 50 at a location below the perforated base plate 56. The bypass tubes 59 are oriented in an upright manner with an L-shaped lower end connecting to the chamber outer wall 52 via a gasket or the like. A passage 58 interconnects bypass tube 59 with the chamber at a location below the base plate 56. The upper end of the bypass tube 59 is normally open, though it may be closed off with a screw cap or the like. By placing the bypass tube connection below the base plate 56, any excess flow from the filter 30' is relieved directly out the bypass tube. This arrangement allows the user to further control the volume and velocity of water entering into the media M.

Any number of these bypass tubes 59 may be positioned about the periphery of the chamber 50, depending on the size of the filter and the particular use.

Figure 6:
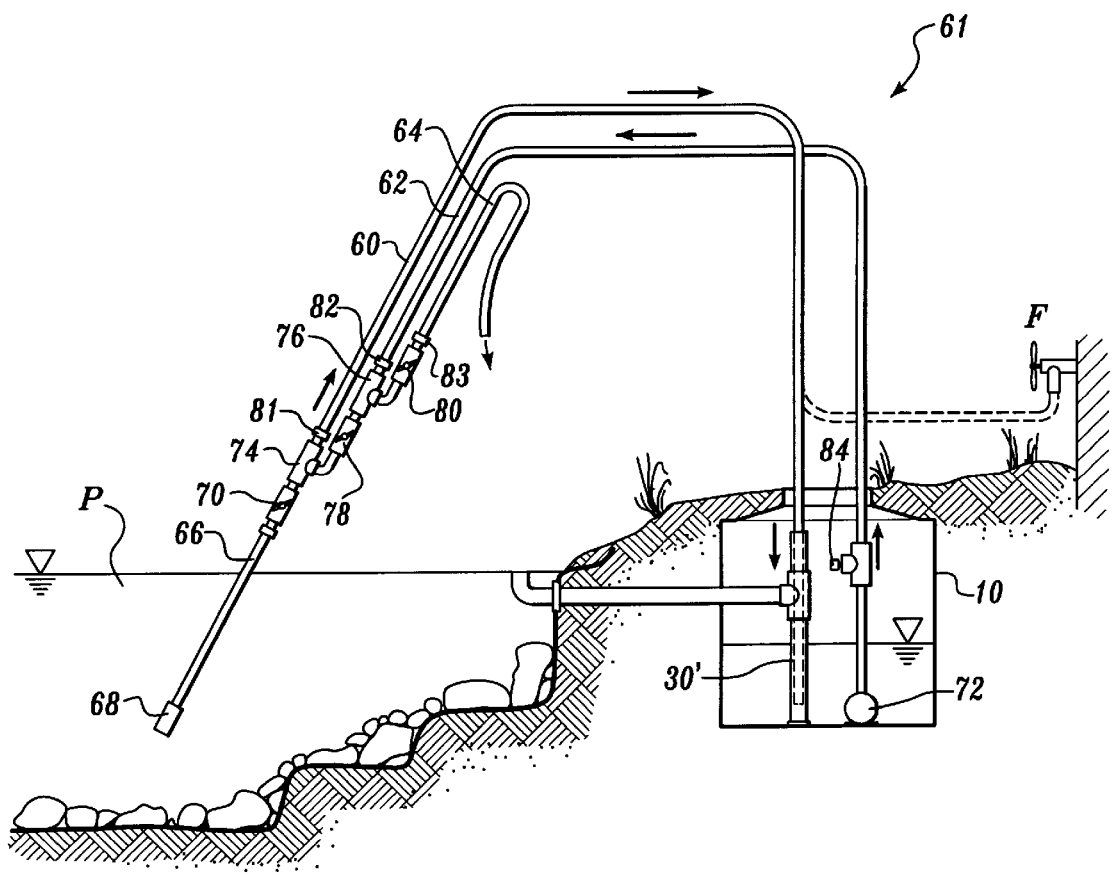
FIG. 6 is a side view of an embodiment of a vacuum assembly formed in accordance with the present invention.

Referring to FIG. 6, a unique vacuum 61 is provided that may be used with the reservoir arrangement. Conceptually, the vacuum 61 is a siphoning system to draw water from the pond P into the reservoir 10. Thus, the vacuum 61 relies on the water level in the reservoir 10 being at a lower elevation than the water level in the pond P. The vacuum 61 may be started by using either a pump 72 in the reservoir 10 or another water pressure source such as a faucet F.

Referring to FIG. 6, one embodiment of the vacuum includes three water lines 60, 62, 64 and a rigid tubular suction head 66. The head 66 includes a distal end 68. The head 66 includes a proximal end with an on/off pipe valve 70. The first water line 60 connects between the head proximal end and the reservoir filter 30. The second water line 62 connects between pump 72 (or faucet F) and a connector 74 located within the first water line 60 near its attachment to the suction head distal end. The third water line 64 connects between pond water and another connector 76 located within the second water line 62 near its connection to the first water line 60. The second and third water lines 62, 64 include their own on/off valves 78, 80, respectively. An optional relief valve 84 may be teed into the output of the pump to prevent damage to the pump in the event of both valves 78 and 80 being left closed for extended periods. The various components are connected using conventional connector elements 81, 82, and 83. In preferred embodiments, connectors 74 and 76 are clear so that the user may visually inspect the flow of water during vacuuming.

During use, the operator positions the head distal end into the pond P. Valve 80 is closed, valve 70 is closed, and valve 78 is open. The operator starts, the vacuum system by applying water pressure from the reservoir pump 72. Water flows into line 62 and out line 60 through connector 74. Once the operator insures that water is flowing smoothly in lines 60 and 62 and passing into the reservoir 10, the siphon valve 70 is opened to allow pond water to enter head 66 and flow into line 60 as well. Once this occurs, valve 78 is closed and water thereafter siphons from the pond P. The siphoning can be observed by viewing debris passing through the clear viewing tee 74. Siphoning continues as long as the distal end 68 remains under water and the water level of the pond is greater than the water level of the reservoir. Line 64 is provided as an option to the above-described system. During vacuuming, if the user prefers to stir up water on the bottom of the pond or within the pond, opening valve 80 allows the incoming water from line 62 to pass out line 64 and be directed as desired by the user. A very fine mesh filter bag 36 is recommended for vacuuming very fine suspended particles in the pond water.

As will be appreciated from the above, various other known components may be used in conjunction with the above-described elements. For example, additional filters may be added to the system outside the reservoir. Various valves may be positioned along the water lines to prevent any unwanted water backflow. A water temperature control element may be included in the reservoir, with a thermostat provided within the pond. Depending on the particular installation, it may be useful to include a more elaborate arrangement of filters in the reservoir at the intake line second end. Or, it may be desirable to include an aeration device or other source of oxygen-enriching components within the reservoir. A drain valve is a useful item to include along one of the return lines so that a pump may be used to reduce the water level within the reservoir during servicing.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A circulation system for use in a water garden, the system comprising:
    (a) a water container adapted to hold water at a preferred fill height, the water container having an upper opening defining a maximum fill height; the preferred fill height being less than the maximum fill height and the difference therebetween defining a surplus water volume amount;
    (b) a separate reservoir capable of holding a reserve of water of an amount at least as great as the surplus water volume amount, during use the reserve water level being at an elevation that is less than the elevation of the preferred fill height;
    (c) an elongate intake line including an open first end defining an intake opening positioned within the water container, said intake opening having a lowermost edge at the preferred fill height, and an open second end connected to the reservoir at an elevation below the intake line first end so that during use, water flows downward via gravity through the intake line and into the reservoir;
    (d) a pump in communication with the reservoir;
    (e) a refill valve positioned within the reservoir, reduction of water in the reservoir triggering the refill valve to provide additional water to the reservoir;
    (f) a return line connected to the pump, the pump transferring water from the reservoir to the water container;
    wherein during normal use; water is circulated between the water container and the reservoir by passing through the intake line and into the reservoir, the pump returning reservoir water back to the water container; wherein during times of surplus water in the water container, the intake line removes the surplus water by storing it in the reservoir; wherein during times of water deficit in the water container, the pump replenishes the water container with water from the reservoir; in each instance, the system thereby maintaining the water level in the water container generally at the preferred fill height.

2. The system according to claim 1, wherein the reservoir includes at least one filter located therein and adapted to receive water from the intake line second end opening.

3. The system according to claim 2, wherein the reservoir includes an upper opening and a lid for the upper opening, the lid including a vent, portions of the filter being removable from the reservoir through the vent.

4. The system according to claim 2, wherein the at least one filter includes a basket filter.

5. The system according to claim 4, wherein the basket filter includes an outer rigid cylindrical wire mesh member and an internal flexible net, the internal net for catching large debris, the outer mesh member for catching smaller debris.

6. The system according to claim 4, wherein the basket filter includes a T-shaped connector with a non-aligning portion connected to the intake line and an aligning portion connected to an upper end of the basket filter.

7. The system according to claim 6, wherein the non-aligning portion of the T-shaped connector attaches to the intake line via a collar slidably engaged therewith.

8. The system according to claim 1, wherein the intake line includes a crosswise slot formed therein at a position in the intake line that is located within the reservoir, and a cover slidably engaged with the intake line at the slot, wherein a mating disc is insertable into the crosswise slot to prohibit unfiltered water from entering the reservoir while the filter is disengaged from the intake line.

9. The system according to claim 8, wherein the disc is one of a solid material and a filter material.

10. The system according to claim 1, wherein the intake line first end opening is formed as an elbow member.

11. The system according to claim 10, wherein the elbow member is rotatable to allow for adjustment of the preferred fill height.

12. The system according to claim 1, wherein the intake line first end opening is formed as an elbow member and at least one extension piece, the combination of the elbow member and the at least one extension piece being positionable at the preferred fill height.

13. The system according to claim 1, wherein the pump is a submersible pump located within the reservoir.

14. The system according to claim 1, wherein the pump is a submersible pump located within the reservoir, the system further comprising a low level shut off switch connected to the pump, the switch being triggered by a low water level within the reservoir to turn the pump off.

15. A circulation system for use in a water garden, the system comprising:

(a) a water container adapted to hold water at a preferred fill height, the water container having an upper opening defining a maximum fill height; the preferred fill height being less than the maximum fill height and the difference therebetween defining a surplus water volume amount;

(b) a separate reservoir capable of holding a reserve of water of an amount at least as great as the surplus water volume amount, during use the reserve water level being at an elevation that is less than the elevation of the preferred fill height; the reservoir including therein an upright basket filter and a T-shaped member connected to an upper end of the basket filter;

(c) an elongate intake line including an open first end defining an intake opening positioned within the water container, said intake opening having a lowermost edge at the preferred fill height, and an open second end connected to the reservoir at an elevation below the intake line first end so that during use, water flows downward via gravity through the intake line, into the T-shaped member, and into the basket filter in the reservoir;

(d) a pump in communication with the reservoir;

(e) a refill valve positioned within the reservoir, reduction of water in the reservoir triggering the refill valve to provide additional water to the reservoir;

(f) a return line connected to the pump, the pump transferring water from the reservoir to the water container;

wherein during normal use; water is circulated between the water container and the reservoir by passing through the intake line and into the reservoir, the pump returning reservoir water back to the water container; wherein during times of surplus water in the water container, the intake line removes the surplus water by storing it in the reservoir; wherein during times of water deficit in the water container, the pump replenishes the water container with water from the reservoir; in each instance, the system thereby maintaining the water level in the water container generally at the preferred fill height.

* * * * *